March 5, 1968  D. G. ZEMAN  3,371,819
POT CONSTRUCTIONS
Filed Oct. 23, 1965
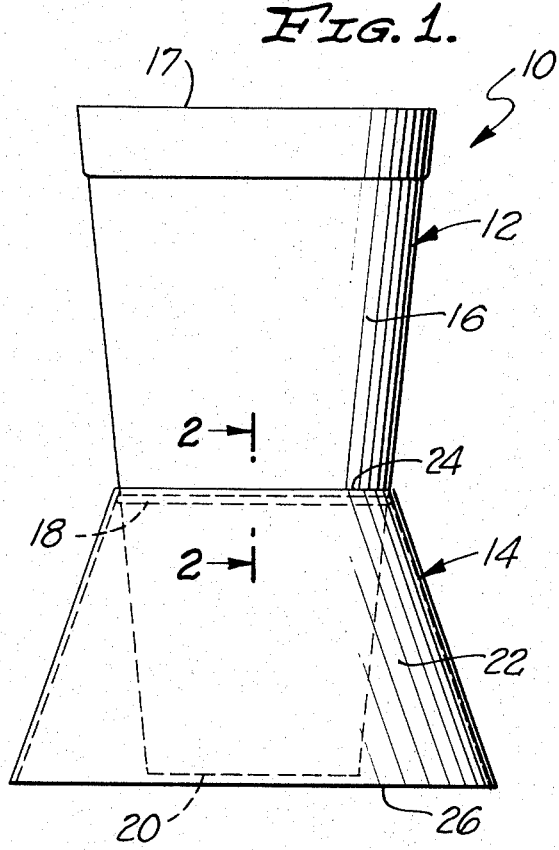
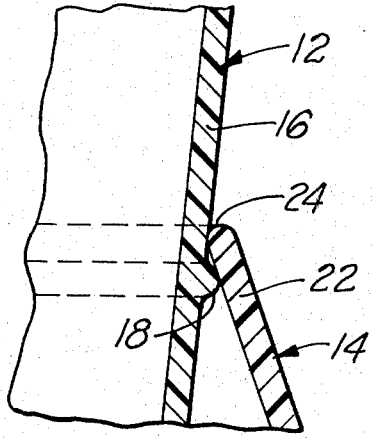
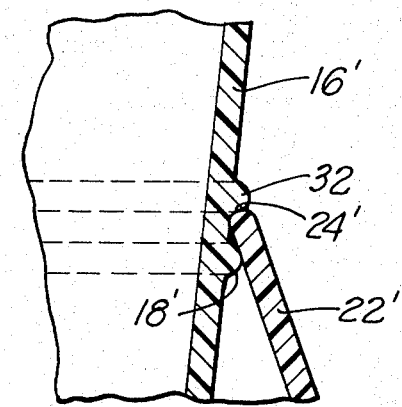
INVENTOR
DAVID G. ZEMAN
BY
EDWARD D. O'BRIAN
ATTORNEY

United States Patent Office 3,371,819
Patented Mar. 5, 1968

3,371,819
POT CONSTRUCTIONS
David G. Zeman, Redondo Beach, Calif., assignor to Floroware Corporation, Redondo Beach, Calif., a corporation of California
Filed Oct. 23, 1965, Ser. No. 503,253
2 Claims. (Cl. 220—69)

ABSTRACT OF THE DISCLOSURE

A pot structure is disclosed having a central pot member of a frustrial conical shape and a base having a frustrial conical shape. The pot member is located so that the upper end of the base engages the exterior of the pot member between its ends. Means are formed on the exterior of the pot member for holding the base with respect to the pot member.

---

This invention pertains to new and improved pot constructions which are primarily intended for use as flower pots for either the growth and/or display of flowers, but which are also capable of being used for virtually an indeterminate number of other purposes.

A very large number of different types of flower pots have been manufactured in the past out of almost the entire range of different known materials. Within comparatively recent periods there has been a decided tendency to manufacture flower pots out of common thermoplastic materials such as various polystyrenes, linear polyethylenes and the like. To manufacture flower pots out of such plastics is considered desirable because such materials are relatively inert, relatively inexpensive, and may be formed into a desired configuration at a comparatively nominal cost.

However, as existing types of flower pots have been manufactured from such plastic materials problems have been encountered. For cost reasons it is normally desired to use as little material in a plastic flower pot as reasonably possible. However, as the amount of material used is decreased the more susceptible the flower pot becomes to breakage. Plastic flower pots of conventional shapes are inherently somewhat susceptible to breakage because of the presence within them of sharp corners, edges and the like which constitute areas or locales of strain within plastic materials under the usual circumstances.

An object of the present invention is to provide new and improved pot constructions which to a singificant degree overcome limitations and disadvantages of prior related plastic flower pots. A more specific object of this invention is to provide plastic pot constructions as herein indicated which may be easily and conveniently manufactured at a nominal cost using a comparatively limited amount of plastic material. Another object of this invention of a more important character is to provide plastic pot constructions which are comparatively resistant to breakage or damage during normal handling and use.

These and further objects of this invention as well as many specific advantages thereof will be more fully apparent from a detailed consideration of the remainder of this specification, the appended claims, and the accompanying drawing in which:

FIG. 1 is the side elevational view of a pot construction of this invention;

FIG. 2 is a partial cross-sectional view taken at line 2—2 of FIG. 1; and

FIG. 3 is a cross-sectional view similar to FIG. 2 at a modified pot construction of this invention.

Those skilled in the arts which this invention pertains will realize that the accompanying drawing is primarily intended so as to clearly illustrate for explanatory purposes a presently preferred embodiment or form of this invention. They will realize that pot constructions falling within the scope of this invention as defined by the appended claims may differ as a result of the application of routine engineering skill and as a result of the incorporation within such constructions of various routine design or ornamentation type modifications.

As an aid to understanding this invention it can be stated in essentially summary form that involves pot constructions, each of which includes a pot member and a base. Both of these parts are formed as frustum of cones for strength and breakage resistance, and they are formed so that the pot member may be inserted into the base so as to be supported thereby. In a pot construction of this invention means are included for holding the pot member and the base with respect to one another.

The actual details of this invention will be more fully apparent in a consideration of the accompanying drawing. Here there is shown a pot construction 10 including a pot member 12 and a base 14 supporting the pot member 12. The pot member 12 has an external wall 16 having the shape of the surface of frustum of a right circular cone, has an open top end 17 and a closed bottom 20. As can be seen from the drawing the bottom 20 is smaller in diameter than the top end 17.

The base 14 has an external wall 22 which also has the shape of a frustum of a right circular cone. This wall 22 terminates in the top end 24 and in a bottom end 26, and is preferably of such a diameter as to correspond to the diameter of the wall 16 between the top end 18 and the bottom 20. The diameter of the top end 24 is also chosen so that when the top member 12 is located in the base 14 as shown the pot member 12 extends to adjacent to the bottom end 26 of the base 14, but is spaced internally of the base 14 from this bottom end 26.

The base 14 is normally held in place with respect to the top member 12 by means of a small flange like ridge 18 formed on the wall 16 so as to extend entirely around the outer surface of this wall. The ridge 18 may, if desired, be of a discontinuous character. The ridge 18 engages the interior of the wall 22 of the base 14 immediately adjacent to the top end 24 so as to hold the base 14 with respect to the wall 16.

The pot construction 10 is formed so that at least the base 14, and preferably the pot member 12 and the base 14 are formed out of a material capable of being deformed, as to the application of the force, and then returning to an initial configuration upon the release of such a force. The material used, of course, should be sufficiently rigid so that when present in sections of a thickness which will depend upon a dimensions of specific pot construction 10 the loads normally placed upon the pot construction are supported without noticeable deformation. Suitable materials possession the necessary properties are common grades of polystyrenes, linear polyethylenes and the like.

When parts of one or both of the pot construction 10 are formed out of such material the pot member 12 and the base 14 may be separately shipped and then "snapped" together by temporary deformation so the base 14 fits with respect to the pot member 12 as shown in such a manner that the base 14 is secured by the ridge 18. When both the pot member 12 and the base 14 are formed from materials as indicated both of them deflect or deform slightly during such an assembly operation. The pot construction 10 is then ready for use.

Once a complete pot construction 10 has been assembled in this manner it can be used in essentially the same manner as any other flower pot. The projecting character of the bottom end 26 of the base 14 tends to prevent tipping during such use. More important, however, the structure of the base 14 serves to absorb shocks and blows such as might break normal flower pots so as to protect the pot member 12 against breakage. This is particularly important as, for example, when the complete pot construction 10 is dropped, is being transported or is being otherwise handled in a comparatively "rough" manner.

The precise type of "snap" together construction illustrated is considered to be particularly advantageous in that it enables a certain amount of deflection or movement between the pot member 12 and the base 14 during such rough handling so that forces delivered to the base 14 are not directly transmitted to the pot member 12, but are absorbed by deflection of the base 14 and are transmitted to the area of interconnection between the pot member 12 and the base 14 where further dissipation of these forces occur. The comparatively long internally unsupported wall 16 of the pot member 12 aids in such absorption of shock or forces when the pot member 12 is made of materials as indicated. It will also be noted that the walls 16 and 22 are free from sharp corners which would tend to become stress points where breakage might be apt to occur.

In FIG. 3 of the drawing there is shown a partial cross-sectional view of a modified pot construction 30 of this invention which is essentially the same as the pot construction 10 except for the addition of another flange like ridge 32. All other parts of the modified pot construction 30 are identical to those parts in the pot construction 10. Hence, such parts which are the same in the two constructions are not separately described herein and are identified herein and in the drawing by the primes of numerals previously used to identify such parts.

In the pot construction 30 the ridge 32 abuts against the top end 24' of the base 14' so that in effect this top end 24' is held between the two ridges 32 and 18'. This provides a more direct manner of transmitting any comparatively heavy load within the top member 12' to the base 14' so as to tend to a degree to eliminate any tendency for deflection of the walls employed. This also provides what is considered to be a more secure holding or positioning of the base 14' with respect to the pot member 12'.

I claim:
1. A pot construction which comprises:
   a central pot member having the shape of a frustum of a right circular cone, the bottom of said pot member being smaller than the top of said member, the bottom of said pot member being closed and the top of said pot member being opened; and
   a base having the shape of frustum of a right circular cone, the upper end of said base being smaller than the lower end of said base, both ends of said base being open, the diameter of the upper end of said base being the same as the diameter of said pot member midway between the ends of said pot member; and
   said pot member being located within said base so that said upper end of said base engages said pot member between the ends of said pot member and supports said pot member;
   means formed on said pot member for holding said base with respect to said pot member, said means engaging the small end of said base;
   said means for holding comprising a projecting flange-like ridge on said pot member, said ridge engaging the interior of said base at the upper end of said base;
   said base being formed of a material capable of deforming and returning to its original condition when subjected to forces tending to break said base.
2. A pot construction as defined in claim 1 wherein said means for holding also includes another flange like ridge formed on said pot member, said other ridge engaging the upper most portion of the upper end of said base.

References Cited
UNITED STATES PATENTS

| | | | |
|---|---|---|---|
| 318,365 | 5/1885 | Fish | 220—13 |
| 2,024,910 | 12/1935 | Cramer | 220—66 |
| 2,585,445 | 2/1952 | Dingeldein | 220—70 |
| 3,230,910 | 1/1966 | Olsson | 220—69 |

THERON E. CONDON, *Primary Examiner.*

JAMES R. GARRETT, *Assistant Examiner.*